United States Patent [19]

Mulder

[11] Patent Number: 4,662,309

[45] Date of Patent: May 5, 1987

[54] PORTABLE POWDER SPRAY BOOTH

[75] Inventor: Douglas C. Mulder, Wellington, Ohio

[73] Assignee: Nordson Corporation, Amherst, Ohio

[21] Appl. No.: 854,558

[22] Filed: Apr. 22, 1986

[51] Int. Cl.[4] ............................................. B05B 15/12
[52] U.S. Cl. ...................................... 118/312; 118/308;
118/326; 98/115.2; 55/356; 55/DIG. 46
[58] Field of Search ................. 118/326, 308, 312;
98/115.2; 55/356, DIG. 46

[56] References Cited

U.S. PATENT DOCUMENTS

| | | | |
|---|---|---|---|
| 2,761,373 | 9/1956 | Owen | 118/326 |
| 3,694,242 | 9/1972 | Ofner | 118/326 |
| 3,714,926 | 2/1973 | Ofner | 118/603 |
| 3,719,030 | 3/1973 | Blankemeyer et al. | 55/356 |
| 3,814,002 | 6/1974 | Rombach et al. | 98/115.2 |
| 3,815,342 | 6/1974 | Watts | 55/356 |
| 3,944,404 | 3/1976 | Andrasfalvy | 55/294 |
| 4,202,676 | 5/1980 | Pelosi et al. | 55/356 |
| 4,245,551 | 1/1981 | Berkmann | 98/115.2 |
| 4,277,260 | 7/1981 | Browning | 55/273 |
| 4,354,451 | 10/1982 | Vohringer et al. | 118/326 |
| 4,378,728 | 4/1983 | Berkmann | 98/115.2 |
| 4,409,009 | 10/1983 | Lissy | 55/302 |
| 4,498,913 | 2/1985 | Tank et al. | 55/356 |
| 4,506,625 | 3/1985 | Vohringer | 118/312 |
| 4,545,324 | 10/1985 | Browning | 118/634 |
| 4,590,884 | 5/1986 | Kreeger et al. | 118/326 X |

*Primary Examiner*—Shrive P. Beck
*Attorney, Agent, or Firm*—Wood, Herron & Evans

[57] ABSTRACT

A self-contained, compact and portable powder spray booth and powder recovery system includes a base unit, and a separate booth removably mounted upon the base unit which can be easily customized to accommodate articles of varying shape and size without changing the design of the base unit. When assembled, the booth and base unit form a powder coating chamber in which spray guns apply powder to moving articles. The articles enter and exit the powder coating chamber through openings which are shaped to accommodate the particular configuration of the articles to be coated. The systems for feeding powder to the spray guns, collecting oversprayed powder and filtering oversprayed powder are all contained within the base unit so that no exterior lines are required in the operation of the system except for a power line and an air line.

8 Claims, 4 Drawing Figures

PORTABLE POWDER SPRAY BOOTH

BACKGROUND OF THE INVENTION

This invention relates to powder spray systems, and, more particularly, to a self-contained, portable powder spray booth and powder recovery system.

The process of spraying products with a solid powder coating involves preparing the powder coating in finely ground powdered form and spraying it onto the parts in a manner similar to liquid paint. Conventionally, but not necessarily, an electrostatic charge is applied to the sprayed powder to enhance the attraction of the powder to the product. The electrostatic charge maintains the powder upon the product for a sufficient time period to permit the powder to be heated so that it melts, and when subsequently cooled, is firmly attached to the target substrate. Powder spraying techniques of the type described above are well known and widely practiced commercially.

In most applications, powder deposition is performed in a booth which provides a controlled area from which any oversprayed powder not deposited on the article is collected. Spray guns mounted in the booth and connected to a source of air-entrained powder, such as a powder feed hopper and powder pump, spray powder onto articles moving through the booth which are suspended from an overhead conveyor. Containment of the powder in the booth is aided by an exhaust system which creates a negative pressure within the booth and causes the oversprayed powder to be drawn through a filter system before the air is exhausted to atmosphere. Oversprayed powder is collected in a powder recovery system where it is either held or recirculated to the powder feed hopper.

In some prior art designs, the spray booth, powder recovery system and filter system are contained within a single unit mounted to the floor, as disclosed, closed, for example, in U.S. Pat. No. 4,409,009. The powder spray booth of this patent is formed with an opening through which articles to be coated are transported by an overhead conveyor. A blower located exteriorly of the unit creates a negative pressure in a powder collection chamber beneath the spray booth to draw oversprayed powder material from the booth and through filters located in the powder collection chamber. The filters remove the powder from the air before it is discharged to atmosphere, and the oversprayed powder remaining is collected in hoppers beneath the powder collection chamber and then transferred through feed lines to a source of powder material, such as a feed hopper, located remotely from the unit.

A more compact powder coating system is disclosed in U.S. Pat. Nos. 3,694,242 and 3,714,926 to Ofner wherein the source of powder material such as a container or vessel is located in close proximity to the spray booth mounted on a fixed frame. Oversprayed powder from the spray booth is returned through a suction line directly to the powder supply vessel where the recovered powder is thoroughly mixed with air and then fed to spray guns mounted in the booth. The powder supply vessel also contains a filter to remove powder from the air entering the vessel before it is discharged to the atmosphere. The compactness of the Ofner system is achieved by including the filter system within the powder supply hopper or vessel, and by recovering oversprayed powder directly from the spray booth rather than from a powder collection chamber and hoppers located beneath the spray booth.

Additional flexibility in certain powder spraying applications has been obtained in prior art systems which include a fixed powder spray booth, and a combined, filter system and powder recovery system which is portable. These systems are particularly useful in applications where frequent color changes are required. The powder spray booths of such systems are formed with an opening at the top or ceiling through which articles to be coated are transported along an overhead conveyor. A portable unit which is movable into position relative to the fixed booth includes a recovery system for collecting oversprayed powder from the booth and a filter system for filtering powder from the air discharged from the booth. The oversprayed powder collected by the recovery system is transmitted through feed lines to a powder feed hopper, or other source of powder material located exteriorly of the booth, which then returns the powder through separate lines to powder spray guns mounted to the booth. Examples of coating systems having fixed spray booths and portable filter-powder recovery units are shown, for example, in U.S. Pat. Nos. 4,498,913; 4,354,451; 4,245,551; 4,378,728; and 3,944,404.

A variation of the systems described above is found in U.S. Pat. Nos. 4,545,324, 4,354,451 and 4,506,625. In these patents, the coating system includes a spray booth with rollers which is movable along the floor with a portable filter-powder recovery unit for positioning at different locations in a building.

One limitation of the powder spray systems described above is the limited flexibility in accommodating different applications and/or different articles to be powder coated. The spray booths of each prior art system described above are one-piece units mounted to an integral filter-powder recovery system or adapted to receive a portable filter-powder recovery system. None of such powder booths can be readily modified to accommodate articles of widely varying shape and/or size without requiring modification of the filter-powder recovery systems with which they are used. This restricts the flexibility of any given system for use in different applications, and, as a result, a different powder coating systems must generally be designed for each individual application.

SUMMARY OF THE INVENTION

It is therefore among the objects of this invention to provide a powder spray booth and powder recovery system which is compact, self-contained and portable, and which has a spray booth whose configuration is readily modified to accommodate different articles without modification of the powder recovery system.

These objectives are accomplished in a powder spray booth and powder recovery system having a base unit containing powder recovery and powder filtering systems, and a separate spray booth removably mounted upon the base unit. The spray booth consists of a ceiling, two sides and a front wall, which, when mounted upon the base unit, forms a powder coating chamber in which articles are powder coated. The configuration of the spray booth may be readily changed or customized to accommodate different articles and different applications without change or modification of the base unit.

More specifically, the portable powder spray booth and powder recovery system of this invention includes a powder recovery base unit having an interior defined by a ceiling, front, back and side walls and a floor. Casters or rollers are mounted to the floor so that the base unit is easily movable to a desired location. The spray booth has a ceiling, opposed side walls and front wall which form an interior open at the back and bottom. The booth unit is removably mounted upon the powder recovery base unit so that the side walls at the back of the booth contact the front wall of the base unit, and the open bottom of the booth faces the interior of the base unit, to form the powder coating chamber.

In a presently preferred embodiment, the front wall of the powder recovery base unit which mounts the booth is formed in two sections including a lower section, and an upper section recessed rearwardly from the lower section toward the center of the base unit with horizontal supports extending therebetween. The booth is mounted upon the base unit by placing the booth atop the horizontal supports and sliding it rearwardly until the side walls engage the upper section of the front wall of the base unit. A controlled powder coating area, or powder coating chamber, is thus formed by the ceiling, side walls and front of the booth, and the front wall and interior of the base unit.

Preferably, each side wall of the booth is formed with a rectangular-shaped opening. A duct is connected to the side walls at each opening which extends inwardly from the face of the end walls toward the interior of the booth. The duct aids in retaining powder within the booth during a spraying operation. Alternatively, the openings in the side walls of the booth could be formed in other shapes to receive articles of different configuration such as pipes, tubes or other elongated objects. The front wall of the booth is formed with an upper panel and a lower panel which are hinged together so that the lower panel is pivotal relative to the upper panel. The lower panel of the front wall of the booth is formed at the same height as the opening in each side wall so that the lower panel forms the front wall of the ducts connected at the openings.

The construction of the portable powder spray booth of this invention simplifies the set up required for many applications. For example, in an application for coating articles such as the non-woven layers of disposable diapers placed on a moving conveyor, the booth is first placed atop the base unit. With the lower panel of the front wall of the booth pivoted upwardly, the base unit and booth are rolled as a unit to the conveyor so that the conveyor is received within the ducts at the side walls of the booth. The lower panel of the front wall of the booth is then lowered into position atop the base unit to close the booth in preparation for spraying.

A powder feed hopper is mounted atop the powder recovery base unit to supply air-entrained powder to a powder spray gun mounted within the powder coating chamber above the path of an article moving therethrough. A powder collection chamber located in the interior of the base unit communicated with the powder coating chamber through an opening in the base unit. Oversprayed powder from the spray guns which is collected in the powder collection chamber is returned by a transfer pump to the powder feed hopper which is equipped with a sieving or screening device. Alternatively, a separate device for removing contaminants from the powder is provided which receives the oversprayed powder directly and then supplies the feed hopper with treated powder. In another embodiment, powder pumps are mounted in the powder collection chamber which return the powder directly to the spray guns, thus eliminating the feed hopper.

A filter air chamber is located in the base unit and sealed from the powder collection chamber except for a pair of spaced openings. A cartridge filter is mounted over each of the openings and extends into the powder collection chamber. A blower located in the filtered air chamber creates a negative pressure therein which draws air from the booth, through the powder collection chamber, and into the filtered air chamber. The static filters over the openings to the filtered air chamber function to prevent powder from the powder collection chamber from entering the filtered air chamber so that no powder is discharged into the atmosphere. Periodically, a blow-back device is activated to clean the cartridge filters of powder, which is then collected in the powder collection chamber for recirculation to the feed hopper.

The powder spray booth and powder recovery system of this invention is entirely self-contained, compact and portable from one place to another. The only exterior lines which connect to the powder spray booth and powder recovery system are a pressurized air line and an electric power line. The fan which creates a negative pressure within the base unit, and the powder feed hopper, both form an integral part of the base unit and booth unit.

The compact construction of this invention permits it to be used in applications where space is limited, such as lines for manufacturing disposable diapers, where larger booths and blowers or powder feed hoppers located outside of the booths take up too much space. Further, the spray booth may be readily customized to accommodate articles of different shape without requiring a change in the design or configuration of the powder recovery base unit.

DETAILED DESCRIPTION OF THE DRAWINGS

The structure, operation and advantages of a presently preferred embodiment of this invention will become further apparent upon consideration of the following description taken in conjunction with the accompanying drawings, wherein.

DETAILED DESCRIPTION OF THE INVENTION

Figure 1:
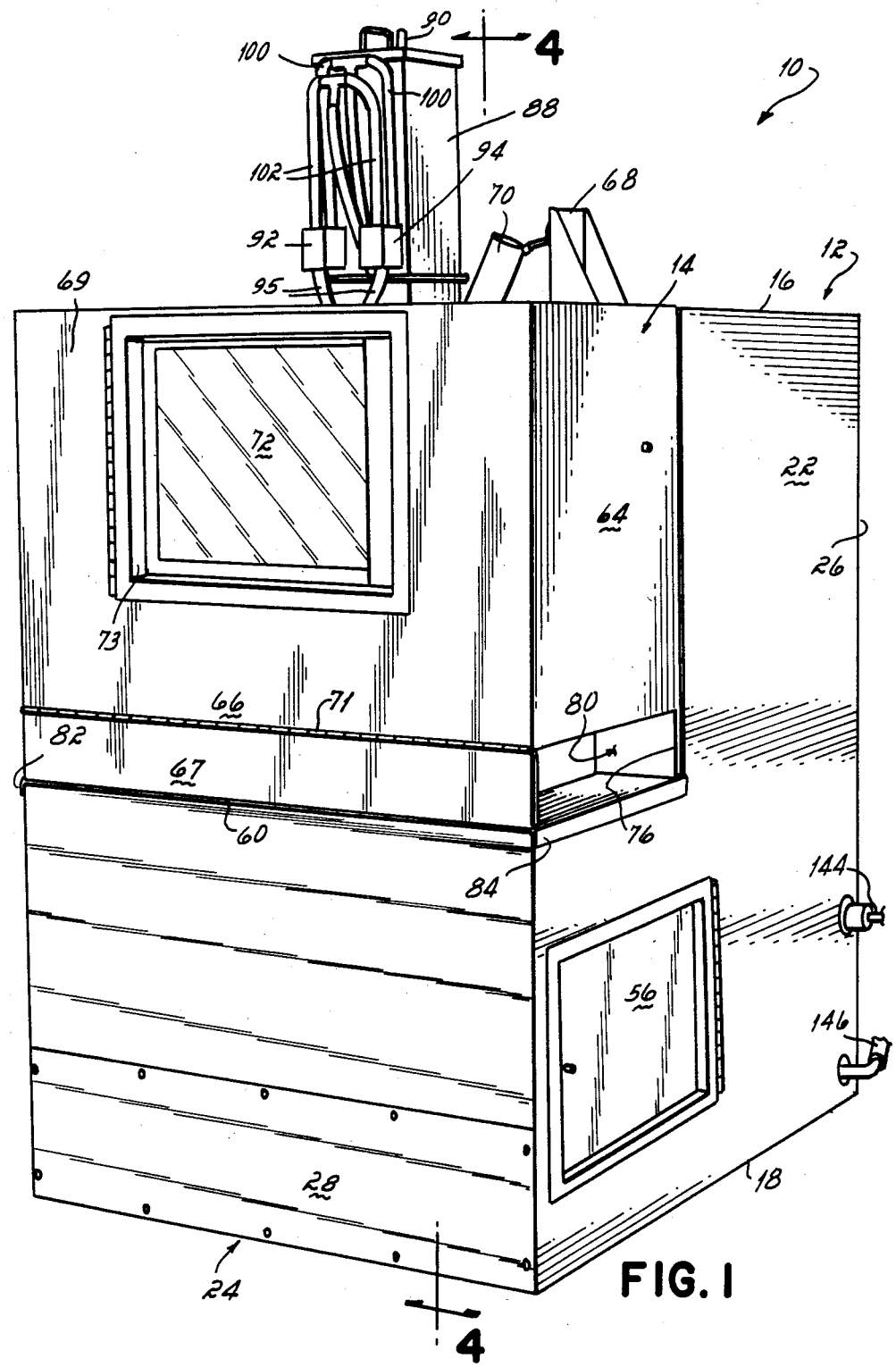
FIG. 1 is an isometric, front view of the assembled powder spray booth and powder recovery system of this invention.
Figure 2:
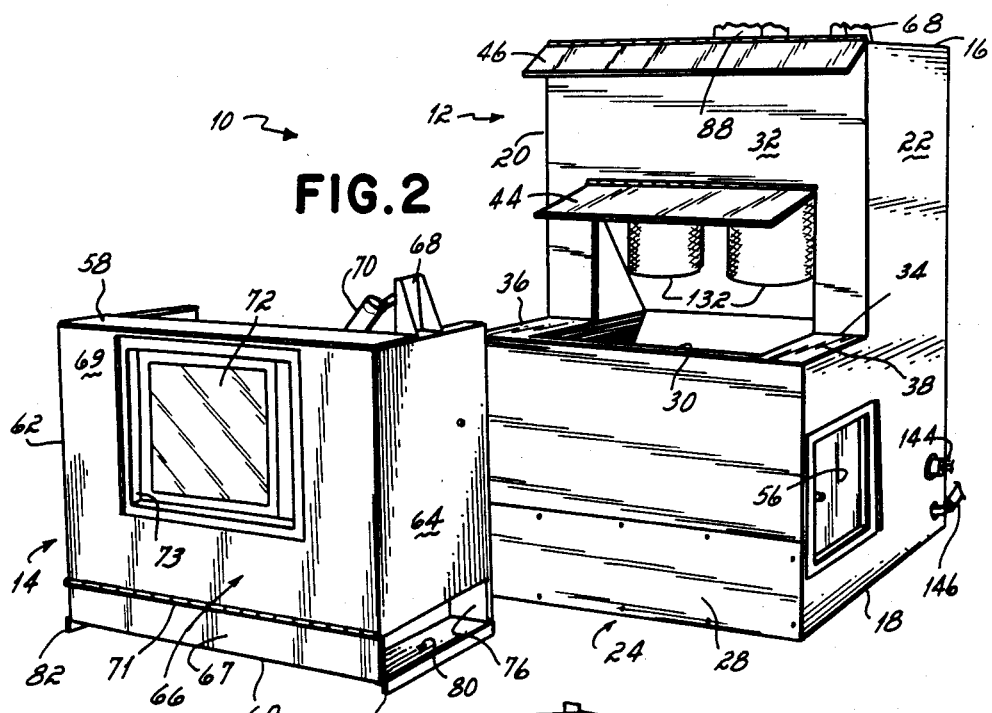
FIG. 2 is an isometric view similar to FIG. 1, except the booth unit is separated from the base unit.
Figure 3:
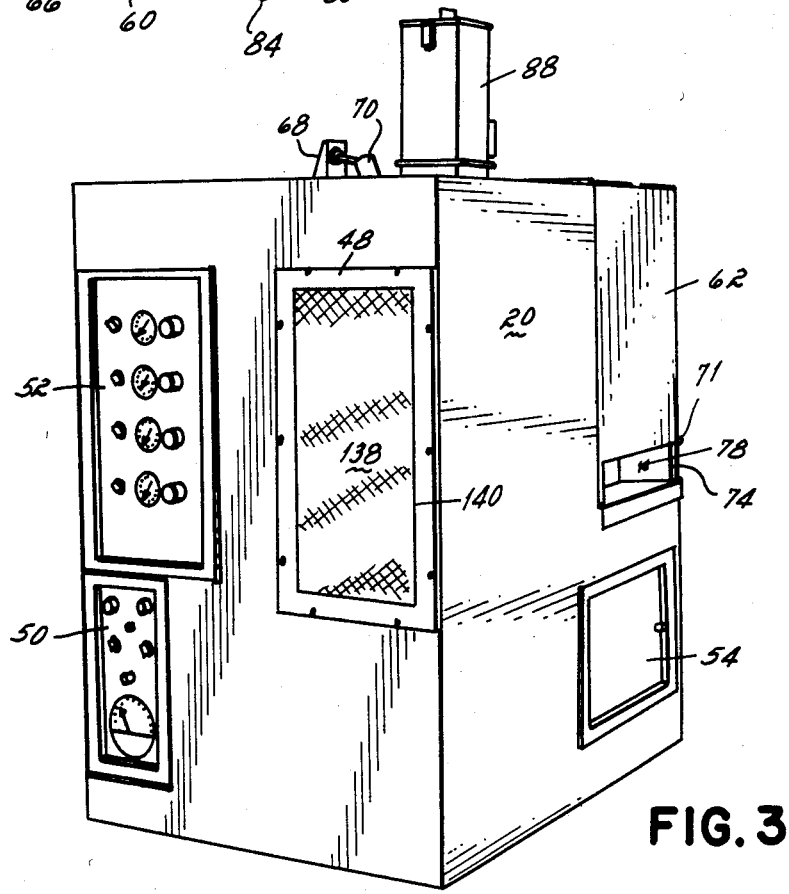
FIG. 3 is an isometric view of the rear of the powder spray booth and powder recovery system showing the pneumatic and electrical controls.

Referring now to FIGS. 1–3, the portable powder spray booth and powder recovery system 10 of this invention includes a powder recovery base unit 12 and a removable booth unit 14. The base unit 12 has an interior defined by a ceiling 16, a floor 18, opposed side walls 20, 22, a front wall 24 and a rear wall 26. The front wall 24 is formed in two sections including a lower section 28 having a top edge 30, and an upper section 32 (FIG. 2) having a bottom edge 34. The upper section 32 is offset rearwardly toward the interior of base unit 12 relative to the lower section 28 forming a pair of spaced, horizontal supports 36, 38 between the top edge 30 of lower section 28 and the bottom edge 34 of upper section 32. As discussed in detail below, an opening is formed between the horizontal supports 36, 38 which defines the upper portion of a powder collection chamber 40 located in the interior of base unit 12. See FIG. 4.

As shown in FIG. 2, the upper section 32 of front wall 24 is formed with a rectangular opening 42 which is partially closed by an access panel 44 hinged to the upper section 32 at the top of opening 42. A top panel 46 is hinged to the ceiling 16 of base unit 12 where it connects to the front wall 24.

As shown in FIG. 3, the rear wall 26 of base unit 12 mounts a grill 48, described in more detail below, and two control panels including an electrical control panel 50 and a pneumatic control panel 52. Each of the side walls 20, 22 are also formed with access panels 54, 56, respectively, as shown in FIGS. 2 and 3. All of the access panels in base unit 12 allow for servicing of the system 10 as required.

The booth 14 comprises a ceiling 58, opposed side walls 62, 64 and a front wall 66 forming an interior which is open at the back and bottom. The front wall 66 is formed with a lower panel 67 and an upper panel 69 connected by a hinge 71 so that the lower panel 67 is pivotal outwardly relative to the upper panel 69. See FIG. 4. As shown in FIG. 2, the ceiling 58 is hinged to the side wall 66 and extends only partially across the top of booth 14 atop end walls 62, 64. The side wall 64 supports a bracket 68 which mounts a conventional ultraviolet light detector 70 operable to stop the flow of powder into the booth 14 in the event of a fire. In order to view the spraying operation within booth 14, a viewing window 72 is mounted to a door 73 hinged to the front wall 66.

In a presently preferred embodiment, each of the side walls 62, 64 of booth 14 are formed with an opening 74, 76, respectively, which are generally rectangular in shape. A pair of ducts 78, 80 are mounted to the side walls 62, 64 of booth 14 at the openings 74, 76, respectively, which extend inwardly from the side walls 62, 64 toward the interior of the booth 14. The inwardly extending ducts 78, 80 help prevent oversprayed powder from exiting the booth 14 during a spraying operation, and, alternatively, could extend outwardly from the side walls 62, 64 to accomplish the same purpose. As shown in the drawings, the ducts 78, 80 have a top, bottom and rear side panel, but are open on the front side facing the front of booth 14. This front side of the ducts 78, 80 is closed by the lower panel 67 of the front wall 66 of booth 14.

The rectangular-shaped openings 74, 76 and ducts 78, 80 are particularly adapted in the illustrated, presently preferred embodiment to receive a conveyor belt 77 which supports the non-woven material used in the manufacture of disposable diapers (not shown). It is contemplated, however, that the openings 74, 76 and ducts 78, 80 could be formed in other configurations to receive objects of different shape such as pipes, rods, tubes and the like, depending upon the requirements of a particular application.

As best shown in FIGS. 1 and 2, the booth 14 is removably mountable upon the base unit 12 by first placing the side walls 62, 64 of the booth 14 atop the spaced, horizontal supports 36, 38 formed in the front wall 24 of base unit 12. Preferably, the ducts 78, 80 are formed with flanges 82, 84, respectively, which prevent lateral movement of the booth 14 with respect to the base unit 12. The booth 14 is then slid rearwardly on the horizontal supports 36, 38 until the rearward edges of the side walls 62, 64 of booth 14 engage the upper section 32 of front wall 24 forming a controlled area between the booth 14 and base unit 12 which defines a powder coating chamber 86 for spraying powder as described below. The booth 14 is removably secured to the base unit 12 with bolts or other fasteners (not shown).

Figure 4:
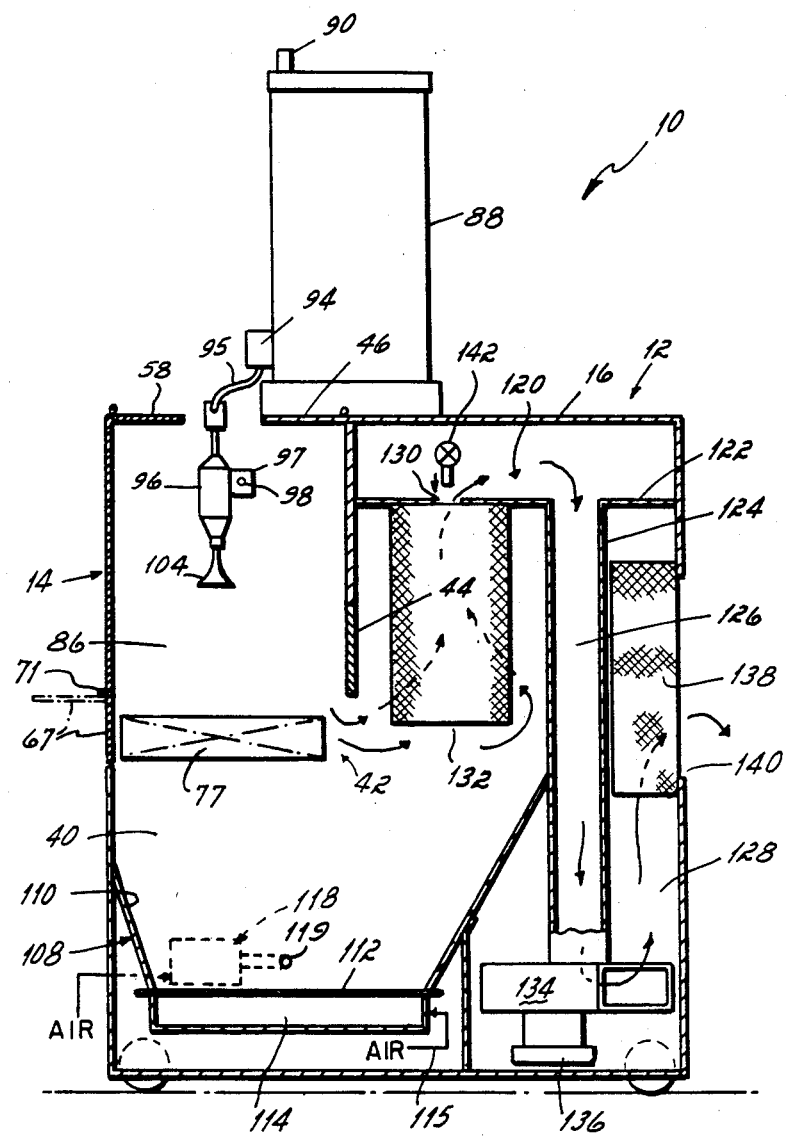
FIG. 4 is a cross sectional view taken generally along line 4—4 of FIG. 1 showing the interior of the powder spray booth and powder recovery system herein.

With the lower panel 67 of the front wall 66 of booth 14 in a raised, upright position, as shown in phantom in FIG. 4, the combined base unit 12 and booth 14 are rolled over the conveyor 77 as a unit. The conveyor 77 moves through the open front side of the ducts 78, 80 into the powder coating chamber 86 formed by the base unit 12 and booth 14. The lower panel 67 is then pivoted to a closed, vertical position to close the powder coating chamber 86 in preparation for a spraying operation.

Referring now to FIG. 4, with the base unit 12 and booth 14 assembled, the hinged top panel 46 of base unit 12 rests atop the side walls 62, 64 of booth 14. Top panel 46 and a portion of the ceiling 16 of base unit 12 support a powder feed hopper 88 having a vent 90. Preferably, the powder feed hopper 88 is equipped with a sieving or screening device, or, alternatively, a separate device for removing contaminants from the powder is connected to the feed hopper 88. A pair of powder pumps 92, 94 are operatively connected to the feed hopper 88, and are connected by lines 95 to a powder spray gun 96 which is mounted upon a bracket 97 movable along a rod 98 connected to the side walls 62, 64 of booth 14. The powder pumps 92, 94 are conventional in operation and each include a pressurized air lines 100 which function to draw or suck powder from the powder feed hopper 88 into the powder pumps 92, 94, and an atomizing air line 102 which entrain the powder in a stream of air within the pumps for ejection through the powder spray gun 96. Preferably, the powder spray gun 96 is of the type illustrated in U.S. Pat. No. 4,543,274, which has a nozzle 104 pointing downwardly within the powder coating chamber 86 of booth 14 for coating objects moving therethrough.

In the embodiment illustrated in the drawings, a conveyor 77 travels through the recessed openings 74, 76 and ducts 78, 80 in the side walls 62, 64 of booth 14. The conveyor 77 supports articles such as the non-woven section of disposable diapers (not shown) for movement beneath the powder spray gun 96 to receive a coating of powder. A portion of the powder material forms a coating upon the articles on conveyor 77, but another portion of the total powder sprayed is not deposited upon the articles. This oversprayed powder may be collected and returned to the powder feed hopper 88, spray gun 96, or a remote scrap drum (not shown).

Referring now to FIG. 4, the powder recovery and powder filtering system of this invention are illustrated. Located at the bottom of base unit 12 immediately beneath the booth 14 is a powder recovery hopper 108 which forms the powder collection chamber in which oversprayed powder is collected. The powder recovery hopper 108 includes tapered side walls 110 connected at the bottom to a fluidization plate 112 mounted above an air plenum 114 connected to an air line 115. The powder collection chamber 40 communicates with the booth 14 to receive oversprayed powder through the rectangular opening 42 in front wall 24 of base unit 12 beneath the access panel 44. Oversprayed powder material is collected over the fluidization plate 112 where it is maintained in a fluidized flowable state by the air plenum 114.

The powder is returned to the powder feed hopper 88 by a transfer pump 118 mounted immediately above the fluidization plate 112, which is connected by a line 119 to the powder feed hopper 88 as shown schematically in FIG. 4. As mentioned above, the powder feed hopper 88 may be provided with a sieving or screening device to treat the powder, or a separate powder treatment device could be employed in which case line 119 would be connected to such separate device instead of feed hopper 88. Although a transfer pump 118 is illustrated in the drawings, a venturi style powder pump such as pumps 92, 94 could be substituted. In such embodiment, the powder pump returns the powder from fluidization plate 112 directly to the powder spray gun 96 rather than into the powder feed hopper 88 or separate powder treatment device.

The filtering system herein is illustrated at the right-hand portion of FIG. 4. A T-shaped duct 120 having a head section 122 and stem section 124 is located within the base unit 12 and forms a filtered air chamber 126. The stem section 124 of duct 120 is spaced from the rear wall 26 forming a final filter chamber 128 therebetween. The head section 122 of duct 120 extends between the rear wall 26 and upper section 32 of front wall 24 to seal the filtered air chamber 126 from the powder collection chamber 40 and powder coating chamber 86. At least two openings 130, only one of which is illustrated in FIG. 4, are formed in the head section 122 of duct 20. A static filter in the form of a cartridge filter 132 is mounted over each opening 130. A blower or fan 134 driven by a motor 136 is mounted at the base of the stem section 124 of duct 120 to create a negative pressure within the filtered air chamber 126 formed by the duct 120. A third cartridge filter or final filter 138 is mounted in the final filter chamber 128 over an opening 140 formed in the rear side wall 26 of base unit 12 which is covered by the grill 48.

In normal operation of the filtering system, the fan 134 creates a negative pressure within the booth and the filtered air chamber 126 and in the powder collection chamber 40. Oversprayed powder from the powder coating chamber 86 which enters the powder collection chamber 40 and does not fall by gravity into the bottom of the collection chamber 40 is drawn by the fan 134 toward the openings 130 formed in the head section 122 of duct 120. The two cartridge filters 132 filter the oversprayed powder material out of the air stream within powder collection chamber 40 so that filtered air enters the filtered air chamber 126 and flows to the final filter chamber 128. In order to provide for substantially complete filtration of the air removed from powder collection chamber 40, the final filter 138 filters the air a second time before it is discharged to the atmosphere through the opening 140 in side wall 26.

The cartridge filters 132 eventually become so covered with oversprayed powder that their filtering efficiency decreases. Periodically, a blow-back device 142 mounted immediately above the openings 130 in the head section 122 of duct 120 is activated to eject a jet of air onto the cartridge filters 132 which removes oversprayed powder from the cartridge filters 132 for collection in the recovery hopper 108. The blow-back device 42 is of conventional design such as shown, for example, in U.S. Pat. No. 4,409,009.

The system 10 of this invention is an entirely self-contained, portable unit. As shown in FIGS. 1 and 2, the only exterior wires or lines are an electrical supply line 144 and an air line 146. No other exterior lines are required.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out the invention, but that the invention will include all embodiments falling within the scope of the appended claims.

What is claimed is:

1. A portable powder spray booth and powder recovery system comprising:

a base unit having an interior defined by a ceiling, opposed side walls, a front wall, a rear wall and a floor, said front wall having a lower section and an upper section offset rearwardly toward the center of said base unit relative to said lower section, a horizontal support extending between said lower section and said offset upper section of said front wall;

a booth removably mounted atop said horizontal support of said base unit and against said upper section of said front wall of said base unit, said booth forming a powder coating chamber;

opening means formed in said booth for receiving a moving substrate within said powder coating chamber;

spray gun means for spraying powder within said powder coating chamber onto the moving substrate;

a powder collection chamber located within said base unit in communication with said powder coating chamber for collecting oversprayed powder;

recirculation means located within said base unit for removing oversprayed powder from said powder collection chamber and returning the oversprayed powder to said spray gun means;

a filtered air chamber located within said base unit and sealed from said booth and said powder collection chamber, said filtered air chamber being formed with at least one opening into said powder collection chamber;

static filter means located within said base unit at said opening to said filtered air chamber for preventing powder from entering said filtered air chamber;

blower means located within said base unit for creating a negative pressure in said filtered air chamber.

2. The portable powder spray booth and powder recovery system of claim 1 in which said booth includes a ceiling, opposed side walls and front wall forming an interior open at the back and the bottom, said booth being mounted upon said base unit so that said side walls at the back of said booth unit contact a portion of said front wall of said base unit to form a powder coating chamber defined by said ceiling, opposed side walls and front wall of said booth and a portion of said front wall of said base unit.

3. The portable powder spray booth and powder recovery system of claim 2 in which said opening means comprises an opening formed in each of said side walls of said booth and a duct mounted to said side walls at each of said openings, said duct extending inwardly from said side walls toward the interior of said booth.

4. The portable powder spray booth and powder recovery system of claim 2 in which said upper section of said front wall of said base unit which contacts said booth is formed with an opening, said powder collection chamber communicating with said powder coating chamber through said opening.

5. The portable powder spray booth and powder recovery system of claim 1 further including roller means mounted to said floor of said base unit for moving said base unit and booth.

6. The portable powder spray booth and powder recovery system of claim 1 further including a powder feed hopper mounted to one of said base unit and said booth for supplying powder to said spray gun means, said powder feed hopper being connected to said recirculation means.

7. A portable powder spray booth and powder recovery system comprising:
   a base unit having an interior defined by a ceiling, opposed side walls, a front wall, a rear wall and a floor, said front wall having a lower section and an upper section offset rearwardly toward the center of said base unit relative to said lower section, a horizontal support extending between said lower section and said offset upper section of said front wall;
   a booth having a ceiling, opposed side walls and a front wall, said front wall being formed with an upper panel and a lower panel hinged to said upper panel;
   said booth being removably mounted to said base unit by placing said side walls of said booth atop said horizontal support of said base unit and against said upper section of said front wall of said base unit;
   opening means formed in each side wall of said booth for receiving a moving substrate within said powder coating chamber;
   spray gun means for spraying powder within said powder coating chamber onto the moving substrate;
   a powder collection chamber located within said base unit in communication with said powder coating chamber for collecting oversprayed powder;
   recirculation means located within said base unit for removing oversprayed powder from said powder collection chamber and returning the oversprayed powder to said spray gun means;
   a filtered air chamber located within said base unit and sealed from said booth and said powder collection chamber, said filtered air chamber being formed with at least one opening into said powder collection chamber;
   static filter means located within said base unit at said opening to said filtered air chamber for preventing powder from entering said filtering air chamber;
   blower means located within said base unit for creating a negative pressure in said filtered air chamber.

8. The portable powder spray booth and powder recovery system of claim 7 in which said opening means comprises an opening formed in each of said side walls of said booth and a duct mounted to said side walls at each of said openings, said ducts each having a top, bottom and back wall;
   said lower panel of said front wall of said booth having the same height as said duct, said lower panel forming the front wall of each said ducts.

* * * * *